US008771052B2

(12) United States Patent
Pececnik et al.

(10) Patent No.: US 8,771,052 B2
(45) Date of Patent: Jul. 8, 2014

(54) WAGERING EVENT ON RANDOM DISTANCE MOVEMENT

(75) Inventors: Joze Pececnik, Smarca (SI); Aljosa Krupenko, Jesenice (SI); Jamie Abrahamson, Las Vegas, NV (US)

(73) Assignee: Interblock d.d., Menges (SI)

( * ) Notice: Subject to any disclaimer, the term of this patent is extended or adjusted under 35 U.S.C. 154(b) by 221 days.

(21) Appl. No.: 13/453,612

(22) Filed: Apr. 23, 2012

(65) Prior Publication Data

US 2013/0281177 A1 Oct. 24, 2013

(51) Int. Cl.
*A63F 13/00* (2014.01)

(52) U.S. Cl.
USPC .................... 463/17; 463/22; 463/25; 463/30

(58) Field of Classification Search
USPC ........................ 463/17, 22, 25, 26, 30, 31, 32
See application file for complete search history.

(56) References Cited

U.S. PATENT DOCUMENTS 5,770,533 A 6/1998 Franchi
6,059,659 A 5/2000 Busch
6,572,474 B2 6/2003 Rudd
7,566,268 B2 7/2009 Asher
2004/0178580 A1 9/2004 Schwartz
2006/0068878 A1 3/2006 Krenn
2007/0102877 A1 * 5/2007 Personius et al. .......... 273/138.2
2008/0113706 A1 5/2008 O'Halloran
2008/0146304 A1 6/2008 Jarvis
2008/0272544 A1 11/2008 Schwartz
2010/0178979 A1 * 7/2010 Katz et al. ....................... 463/25

* cited by examiner

*Primary Examiner* — James S McClellan
(74) *Attorney, Agent, or Firm* — Mark A. Litman & Associates

(57) ABSTRACT

A method and apparatus provides a wagering game. Steps may include:

a. providing a game field and a position indicator on the game field;
b. positioning the position indictor on a first position on the game field;
c. accepting a wager on a game event;
d. providing a first random event outcome, including moving the position indicator on the field from the first position to a second position;
e. repeating a first additional random event outcome providing instruction for moving the position indicator from the second position on the game field to a third position;
f. repeating at least one additional random event outcome that provides instruction for moving the position indicator from the third position in a direction on the game field to a fourth position; and
g. determining an outcome on the wager based on a final position on the game field.

27 Claims, 7 Drawing Sheets

WAGERING EVENT ON RANDOM DISTANCE MOVEMENT

BACKGROUND OF THE INVENTION

1. Field of the Invention

The present invention relates to the field of wagering games, particularly casino wagering games, and more particularly to casino wagering games based on random distances moved by a game piece from a start position based on physical or electronic random event generators providing movement directing outcomes.

2. Background of the Art

Most game outcomes in a casino are determined by single event determination. Some individual side bets are determined by multiple winning event outcomes, as with the Fire Bet™ wager in craps, or consecutive win wagers in roulette, blackjack or baccarat.

A few wager event outcomes are based on random direction movement outcomes. Published U.S. Patent Application Document Nos. 20040178580 and 20080272544 (Schwartz) disclose a board game and methods of playing a board game. The board game involves the movement of a game piece based upon the generation of a random number. The game piece is moved until the movement causes a win or loss scenario, which may be conducive to gambling and making wagers. During the movement of the game piece, the bank may inchoately match the player's wager. The inchoate "cargo" excites, tempts, and entices the players to wager and increase player involvement.

Published U.S. Patent Application Document Nos. 20080146304 (Jarvis) describes an electronic game that simulates trading securities on an exchange. The game is preferably played as a video gaming machine for gambling purposes. A computing device is provided having, among other things, a video screen display on which a line chart is displayed. The computing device also includes a selection device, which provides a means by which the player interacts with the computing device to "buy" or "sell." The line chart includes a vertical axis that corresponds to the value or price of one or more securities, and a horizontal axis that corresponds to time. A segmented line is plotted on the line chart during a round of play. A random number generator randomly determines the vertical axis value for each point plotted along the segmented line.

U.S. Pat. No. 7,566,268 describes a method, comprising the steps of: receiving from a user a bet on a roulette game; receiving at least one event result of a sporting event that comprises a total number of participants; a computing apparatus selecting from a memory device a set of rules, from a plurality of sets of rules, based at least in part on the total number of participants in the sporting event; wherein the plurality of sets of rules are used for determining, based on event results of sporting events, outcomes that represent simulated roulette spins, the outcomes comprising at least one of: numerical values, and colors, wherein at least a first set of rules of the plurality of sets of rules are used for determining outcomes based on sporting events that have a first total number of participants; wherein at least a second set of rules of the plurality of sets of rules are used for determining outcomes based on sporting events that have a second total number of participants, and wherein the first total number of participants is different from the second total number of participants; the computing apparatus using the selected set of rules to determine, based at least in part on the at least one event result, at least one outcome that represents a simulated roulette spin; and determining a result of the bet on the roulette game based at least in part on the at least one outcome.

All references cited herein are incorporated in their entirety by that citation and reference.

SUMMARY OF THE INVENTION

A method and apparatus provides a wagering game, either a triggered side bet wagering game or a direct side bet wagering game. Steps may include:

a) providing a game field and a position indicator on the game field;
b) positioning the position indictor on a first position on the game field;
c) accepting a side bet wager or a direct bet wager on a game event determined by multiple random event outcomes;
d) optionally requiring a triggering event to enter the side bet event or automatically entering the side bet event after the wager;
e) providing a first random event outcome, wherein the random event outcome provides instruction for moving the position indicator on the field from the first position in a direction on the game field to a second position;
f) repeating a first additional random event outcome that provides instruction for moving the position indicator on the field from the second position in a direction on the game field to a third position;
g) repeating at least one additional random event outcome that provides instruction for moving the position indicator on the field from the third position in a direction on the game field to a fourth position; and
h) determining an outcome on the wager based on a final position on the game field.

Position indicators used in the game are moved from a starting point in a random manner, with at least two different vectors required in available position changes. For simplicity, the vectors are preferably opposite, such as forward and backwards, up and down, left and right, clockwise and counterclockwise. When played in a three-dimensional format, the vectors may be opposite and/or along three traditional dimensional axes, such as right angle x-y-z axes, with + and − vectors along each axis.

DETAILED DESCRIPTION OF THE INVENTION

Figure 1A:
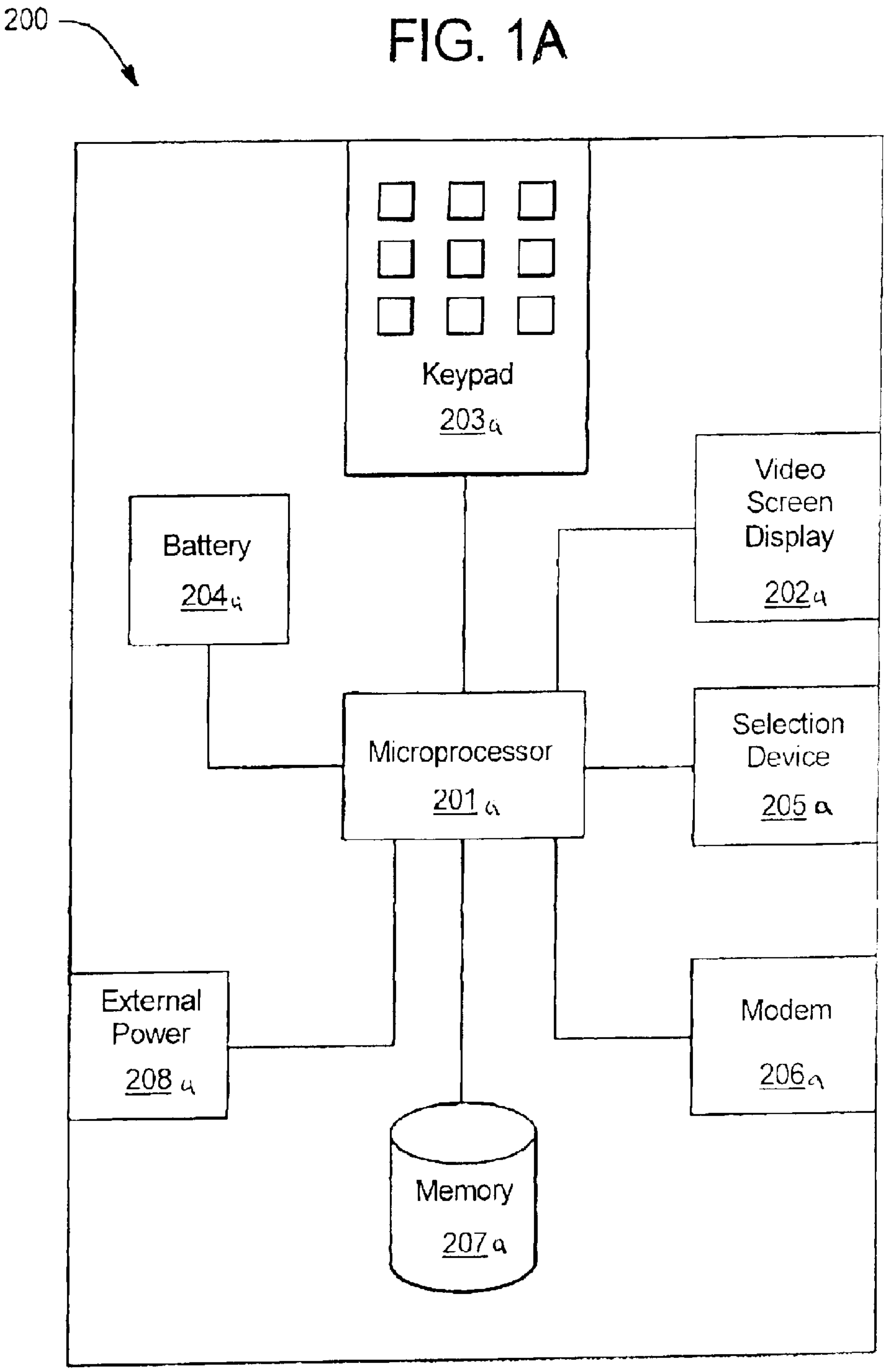
FIG. 1A shows a schematic of a player input terminal in a system enabling play of the present technology.

The present technology includes a method of providing a wagering game including:

a) providing a game field and a moveable position indicator on the game field. The game field may be any visual field with quantified dimensions or values extending along a dimension on the game field, such as the length of the game field. The quantified dimensions are desirable so that a player can visualize and quantify absolute and vector values of individual movement and collective movement. The field may be a numerical or dimensional grid with visual demarcations, areas or regions along which a position indicator may be placed. For example, the field may have equal dimensionally spaced lines along the length with alphanumeric indicators distinguishing the lines, or may have areas along a dimension or shape. For example, the game field may resemble an American football field or Canadian football field. Ice rinks, soccer fields, field hockey fields, swimming pools, horse tracks, car tracks, and other athletic fields may also be used with the demarcations added on the game field, even if not ordinarily present on the actual sports field. The movement may be linear, angular, circular or in three-dimensions.

b) positioning the position indictor on a first position on the game field. This can be referred to as the Start position, the Base position, the Home position, or the like. It is convenient to have the first position in a geometric or numerical center of the game field, although requiring or allowing the position to be off center (weighted towards one end or the other) can adjust the odds or adjust pay tables on various wagers. As explained in greater detail, by positioning the position indicator off center and wagering on different final positions relative to the center, different odds may be provided for final positions in opposite directions and same dimensions/distances/values away from the center.

c) accepting a wager on the game event determined by multiple random event outcomes that involves moving the moveable position indicator. Various wagers may be available and the wager outcomes and odds may vary, as indicated above, based on an original position for the position indicator. There may be a single position indicator used for the wager or individual position indicators may be used by different players on different wagers.

d) optionally requiring a triggering event to enter the side bet event or automatically entering the side bet event after the wager.

e) providing a first random event outcome, wherein the random event outcome provides instruction for moving the position indicator on the field from the first position in a direction on the game field to a second position; repeating a first additional random event outcome that provides instruction for moving the position indicator on the field from the second position in an indicated direction (e.g., the vector component of positive or negative, left or right, clockwise or counterclockwise, etc.) on the game field to a third position;

f) repeating at least one additional random event outcome that provides instruction for moving the position indicator on the field from the third position in an indicated direction on the game field to a fourth position; and g) determining an outcome on the wager based on a final position on the game field, whether or not a position has been reached beyond which the position indicator cannot be moved.

The final position may be the fourth position, or an additional number of predetermined similar steps may be performed. There should be an underlying number of predetermined steps in the side bet wager, however, whether three, four or more. If a side bet game were allowed to proceed without limit, there would always be a winning outcome, which would be unacceptable. There may be additional steps (movement determining outcomes) that could be added to the original predetermined number or steps subtracted from the original determined number based on the random event outcome. For example, if on the roulette wheel a 0 outcome is +5 yards, that outcome may be allowed as +5 yards plus an additional spin. Similarly if a 00 outcome is −15 yards, that outcome could be moving −15 yards and losing one of any remaining spins.

In the method described herein, at least the fourth position is the final position, although a predetermined ending number of event outcomes may be set (e.g., three event outcomes is an absolute end of the side bet, four event outcomes is an absolute end of the side bet, five event outcomes is an absolute end of the side bet, or a specific number that is at least six event outcomes is an absolute end of the side bet. For example, at least one additional random event outcome provides instruction for moving the position indicator on the field from the fourth position in a direction on the game field to a fifth position; and determining an outcome on the wager is based on a final position on the game field. In this format, the fourth, the fifth, the sixth or at least the seventh position is the final position.

The underlying play of the game and the movement of the position indicator can be performed in many different ways, as clearly described herein. Difference amounts of movement, different directions of movement and other movement aspects may be used as described herein. Additionally, the side bet game may be played with roulette in two modes, using any of these various movement differences. The side bet may require a triggering event or may be a direct side bet game with no triggering event. The difference is described herein.

For simplicity, most of the descriptions used herein are for a direct side bet event. That is, the gaming system receives a side bet wager, and the next 3, 4 or however many spins are used in the game are used to move the position indicator. Using a triggering event (such as a 0 or 00 or consecutive 0's and/or 00's actually simplifies play of the game, as will be shown later. However, for purposes of explanation, a direct side bet is easier to describe. Once the side bet is played in this direct variant, all next series of spins are part of the direct side bet game. This format has one difficulty in that once a first game piece (position indicator) has been moved and is in play, this could prevent or deter other players from entering the side bet after a first move with the position indicator. This is less a problem or concern with an electronic system, where each player position could have a unique or overlapping (with other players making the side bet wager at the same time) position indicator. In the electronic system, it would be possible to easily provide multiple ongoing side bet position indicators at the same time.

To overcome that problem in a physical game, multiple side bet indicators could be used, with indicators of different colors, size or shapes or with indicia thereon distinguishing among the different indicators. Also, on the game field, the field may have different sections (e.g., there may be three separate columns along the length of the field) with different indicators. Therefore, side bet wagers on a first spin may be indicated by position indicators in the first column, side bet wagers on a next spin may be indicated by position indicators in the next or second column, and side bet wagers placed to begin on a third spin may be indicated by position indicators in the third column. This is merely an issue with the clarity of the indication of the different ongoing contemporaneous wagers, and not an issue of enablement.

The use of a triggering event to begin the side bet wager play is simpler as once side bet wagers have been placed at the various player positions, the wager is either collected on the next spin (no triggering event occurs) or the side bet game then begins (a triggering event has occurred). One triggering event may be a 0 or 00 after a side bet has been placed and received, although any event or series of events (repeat of a number, three consecutive numbers is a three-number line, etc.) could be used as the triggering event. The use of electronic systems simplifies the recognition and availability of alternative trigger events to the 0 or 00 triggers. In a manual or physical side bet play, a position indicator may be left off the table until the game is to begin, or left in position during the game and then moved only after the triggering event. The position indicator may be moved mechanically (e.g., a track provided in the table, with yardage moved by a step motor, conveyor or the like) to add security to the movement. It is preferred that an electronic display be used for the movement of the position indicator as this is the most secure. The croupier may input either the number determined in the roulette spin or actual yardage and direct to be moved, and the processor receives this input and the position indicator is automatically moved. This will reduce croupier error and will also prevent players from accidentally or intentionally moving the position indicator.

In using the triggering event for the game, the probability of the game beginning and the odds available for the game may be controlled. For example, 0 and 00 occur at a statistical frequency of 1/19 times (2/38 times). In addition, the player may then have to select the winning team (direction) which occurs at a statistical frequency of 1 in 2 times. Therefore, even if the payout on the game was 35:1 (on average) every time the side bet game was played, there would be a significant profit for the casino, yet a significant payout for the players. If a European style roulette wheel was used (with only the 0), the frequency of the game being played would be 1/37, and average payout could be even higher. Other triggering events could also be used, even though the use of 0 and 00 are the simplest and most efficient. For example, any number repeating itself could be a trigger. A simpler method that has its own unique merits is having any player with a single number wager bet (e.g., a bet on a single number, not multiple numbers) that also has a side bet wager placed, triggers the side bet game for that player only. This method is simple in both physical and electronic systems. In the physical system, as each player has unique colors for chips, and only matching colors on the single number wager and the side bet would trigger the side bet game for that particular player. It is thought that this last triggering mechanism could both promote more single number wagers and greater interest in the side bet game.

The method of the present technology may use any random event outcome that quantitative (distance or value) and a vector (directional, forward-backward, left-right, or up-down, and combinations of these which can be used to move the position indicator. There may be a single random event (one outcome can provide the entirety of the information, quantity and vector) or two events can occur that provide each of the factors (one provides the quantitative factor and the other provides the vector factor). For example, the random event outcome comprises a ball drop in a roulette wheel. With a ball drop event, there are a number of ways in which the factors may be provided. For example, a red number outcome may indicate movement of the position indicator in a first direction having a first vector and a black number outcome may indicate movement of the position indicator in a second direction having a second vector different from the first vector. The green number(s) may indicate a zero (0) vector. It is also possible for odd and even to provide the vectors (with the zero(s) again being vector neutral). It is further possible for individual columns (the three columns of 12 numbers each) to represent positive, negative and neutral numbers. In this last format, the zero(s) may have positive move values (e.g., 0 positive 10, 00 negative 10, or each one of 0 or 00 moves the position identifier in a single direction or in a direction that is beneficial to the present position of the indicator). With regard to the last, for example, if the position indicator is already +15, the added 0 or 00 value of 10 would be added to make the next position +25 rather than +5 if the beneficial position is further away from the initial start point, or move the position indicator negative 10 so that it is +5 if the beneficial position is closest to the initial start point. The preferred random event outcome comprises a ball drop in a roulette wheel.

The random event outcome generator may be a mechanical or physical system, an electronic system, or an electromechanical system (e.g., with some mechanical elements and some electrical elements). For example, a live dealer may spin the wheel and ball, the dealer may read the outcome and indicate the result by physical placement of a marker, a physical indicator on a demarked game field is moved, and the game played to conclusion for the game field event. Wagering may be physical tokens, chips, currency and the like on wagering positions on a table, or may be electronically deposited and credited wagers and outcomes resolved by the processor and displayed on monitors. The entire game may be a side bet played on a purely electronic system or an electronic system played parallel with a physical or partly physical random event generator such as the roulette wheel and ball drop. Various combinations of physical, mechanical and electronic components and systems may be combined.

An example of an electronic, electromechanical and/or physical system may include the following system and components thereof. Such systems include at least Published U.S. Patent Application Document No. 20060068878 (Krenn) discloses a system where multicolored casino wagering chips are assigned temporary values and those values are transmitted to a separate device, such as a chip sorter that is used to determine chip values and value flow during a casino table game. A single color chip is temporarily associated with a chosen value for that color chip, and the value/chip relationship is provided to all systems that use that relationship in assessing game performance, wins, losses, payouts, record keeping, and security for the table game. In one embodiment of the technology described herein, a set of opposed slots on a rack is provided, with a single color of chip and an electronic marker positioned on an opposed pair of slots. The marker sends out a signal regarding the temporary value of the color chip, and that sent value is used by all automated systems on or about the gaming table to assign value to that color chip. At the conclusion of play with a particular color of chip, all the chips are returned by the player, the chips repurchased, and the value is erased from the records for that particular chip. The markers and chips may be displayed on the rack for visual inspection during play.

U.S. Pat. No. 5,770,533 (Franchi) describes a casino operating system for controlling the flow of funds and monitoring gambling activities in a casino or a gaming establishment utilizing a network of computers, including a central computer and individual game computers. Each player receives an encoded betting card from the cashier. At the games, each player position is equipped with a control panel including a card reader into which the betting card is inserted. The control panel also includes an electronic screen and keyboard. From the control panel, the player may place a bet and perform all options available to the player in the particular game. The system records the hands dealt to each player and the winner, and credits or debits the player's betting card accordingly. In an alternative embodiment, the casino operating system allows the players to use chips to place bets instead of the above-described betting card. The chips are marked or encoded so that they can be counted once final bets have been placed to determine the amount of each player's bet. In games requiring the placement of bets in certain positions on the gaming table, each player may be provided with a betting marker used to indicate the position of his bets on the table. A touch-sensitive screen may be used whereby bets are placed by touching the desired position on the screen, or a two-way remote control console may be provided for entering bets.

U.S. Pat. No. 6,572,474 (Rudd) describes a croupier's payout calculation aid for calculating payouts for a game playable by a number of players, the game allowing a player to make multiple bets with chips of a distinguishable color that are used only by that player, at least some of the multiple bets having different payout odds as to a result determined by a spin of a rotating element. The aid includes: a data-input module including identifier data entry means having a data entry button dedicated to each respective color for entering data indicating the distinguishable color of chip corresponding to each of the number of players. The aid also includes a chip value data entry means for entering data indicating a corresponding monetary value for each the distinguishable color of chip.

Published U.S. Patent Application Document No. 20080113706 (O'Halloran) discloses a wagering system for a wagering game uses at least one live random outcome game piece in the play of the wagering game. A gaming table is used with the at least one game piece to determine a random outcome. At least two player interface wagering systems with a visual display are provided on each player interface wagering system. Each player interface wagering system is in communication link with a game server that processes game data and determines wager outcomes. Each player interface wagering system has at least two selectable wagering input displays that may be separately selected and displayed by a player wagering at each player interface. Each of the at least two selectable wagering input displays identifies different sets of wagers that may be placed by 1 the player on the random outcomes of the wagering game.

U.S. Pat. No. 6,059,659 enables a progressive roulette system with hardware and software that may be adapted to the technology of the present invention.

Hardware Considerations

An interface between a Dealer PC and the display controller is provided to receive bets placed by the player terminals in real time and send them to the display to be represented on display screen. A display controller may be used to create a 3d graphical representation of chips stacked as they would be on a live table. An intelligent sound system can be used to interface with the game controller and display controller to play different sounds and sound volumes depending on what stage and state of play the game is in. Includes speakers and a subwoofer in the table to vibrate the table and give it feel at certain points in the game. For example, rolls may be announced, running points may be announced before each roll, audio reminders of specific wagers may be made (e.g., red-black, odd-even, odds on number bets, odds on columns, odds on lines, odds on side bets, etc.). Moderate size such as 10 inch" (25.4 cm) touch screens may be connected to the craps table with a layout of the game for the players to interact with the game. Serial Card reader can be provided for players to insert rating cards which are logged in the Rapid Database. A dealer PC may be provided that the dealer operates to start the game, enter results, buy in players, cashout players and open/close the table. Server PC with SQL database can be provided. BOH PC with Reporting and configuration utility can be provided. A relatively larger 26 inch (65 cm) LCD screen or other monitor can be used for Display or results, histories, and other information. A steel frame Crap Table designed to be enclosed to house peripheral equipment under the playing surface and have the 10 inch (25.4 cm) touch screens attached can be provided as a standard equipment piece.

Software Consideration

SQL Database for holding game configuration and game data and player ratings can be provided into the system. Table Configuration software to configure odds, table layout, betting positions, commission value, table maximum and minimum, bet position maximum and minimum as well as chip values should be provided in the system. Reporting software, for reporting to central auditing, record keeping, player comping, central finance area can and should be provided. SGC software to allow the dealer to start the game, enter the result, confirm the result, open/close the table, buy in players, cash out players and disable/enable player terminals should be provided in the system. Terminal Software to show the table layout on the 10 inch (25.4 cm) LCD Touch screens and allow the player to interact with the game are preferred, although table menu prints of wagers are acceptable. The layout on the terminal may have various magnification points to allow the players better access to betting positions represented on the small screen, either upon demand or automatically as wagers are being placed in particular areas of the table layout image. There may also be prompting configured into the terminal software to allow new players to follow the game by graying out area's on the screen where a bet cannot be placed or prompting players to move bets to positions with better odds. There is also an in depth help function that players can follow on game rules, common Craps terminology and betting positions. Game Controller software is used to catch or read bet positions and values from player terminals as they are received by the SGC and send them to the display controller in real time. Display software may be provided on the display controller PC with the capability on showing the game play in real time on a 3d representation of the game table along with a number tree of previous results of individual throwers and animation of dice, table open and closed.

FIG. 1A shows a schematic of a player input terminal 200 in a system enabling play of the present technology. Keypad 203*a* allows player input for all wagers, including the random position wager of the present disclosure. A battery 204*a* may provide backup to the microprocessor 201*a* in the terminal 200 should the External Power 208*a* fail. Memory 207*a* is available to the microprocessor 201*a* for game rules, random event generation (if needed), look-up table, electronic reading capability for ball drops, and the like. The selection device 205*a* refers to the roulette wheel and ball. The video screen 202*a* represents a player display screen. A modem 206*a* would be used especially if there were to be distal transfer of data, events, outcomes, credit activities, wards and the like. The modem 206*a* may be replaced with a hardwire, wireless, wifi, or optical information transfer system.

Figure 1B:
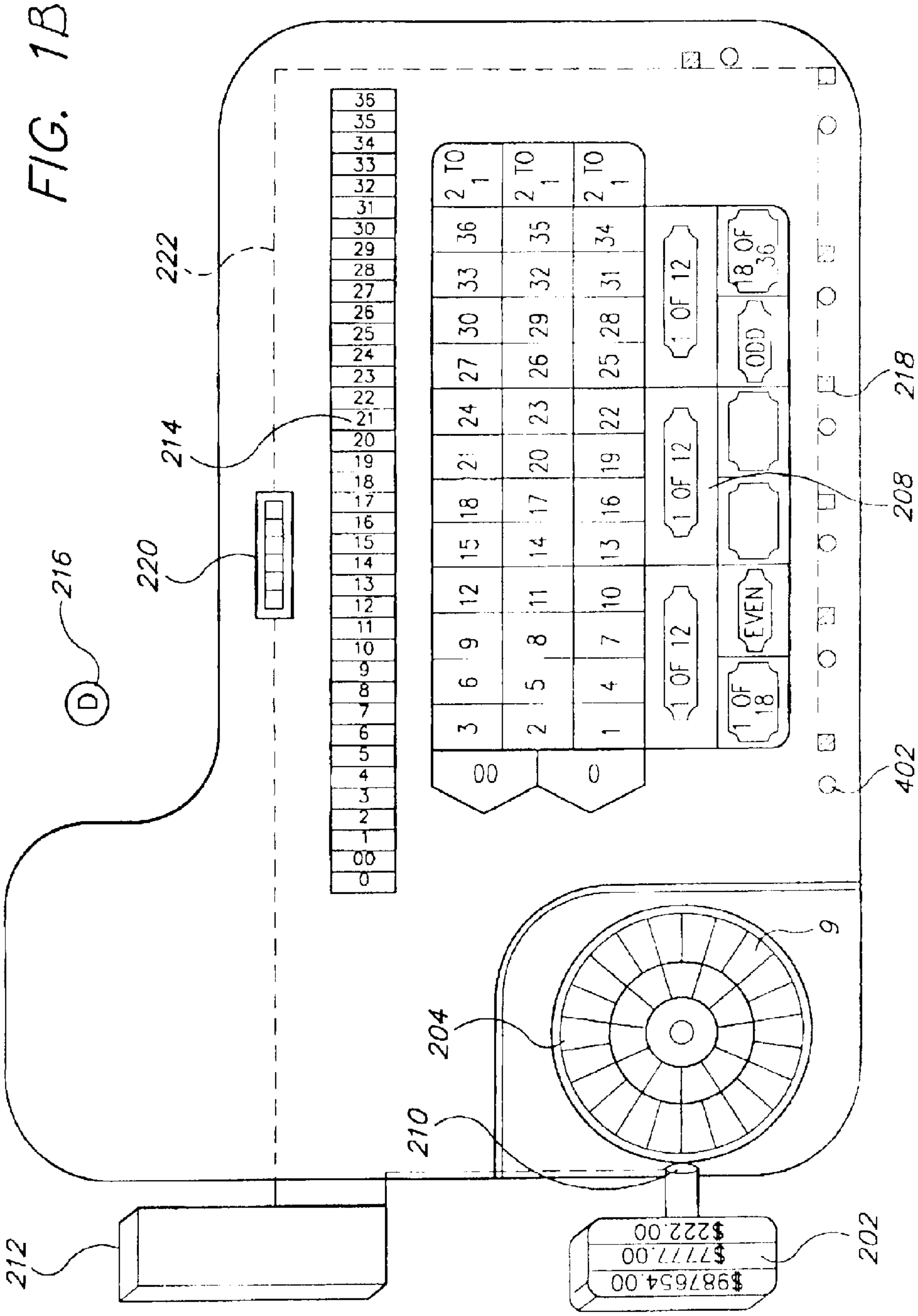
FIG. 1B shows a table layout with game field display in a system enabling play of the present technology.

FIG. 1B shows a table layout 216 with a video game field display 212 in a system enabling play of the present technology. The roulette wheel 204 with canoes 9 therein and a post 210 supporting a progressive jackpot display 202 are shown along with typical wagering positions 402 (red) 218 (black), combination number wagers 208 and an individual display system 214 for showing individual spin results. An electronic or electrical network 222 carries signals under or in the table 216 through a dealer control panel 220 to the game field display 212.

Figure 2:
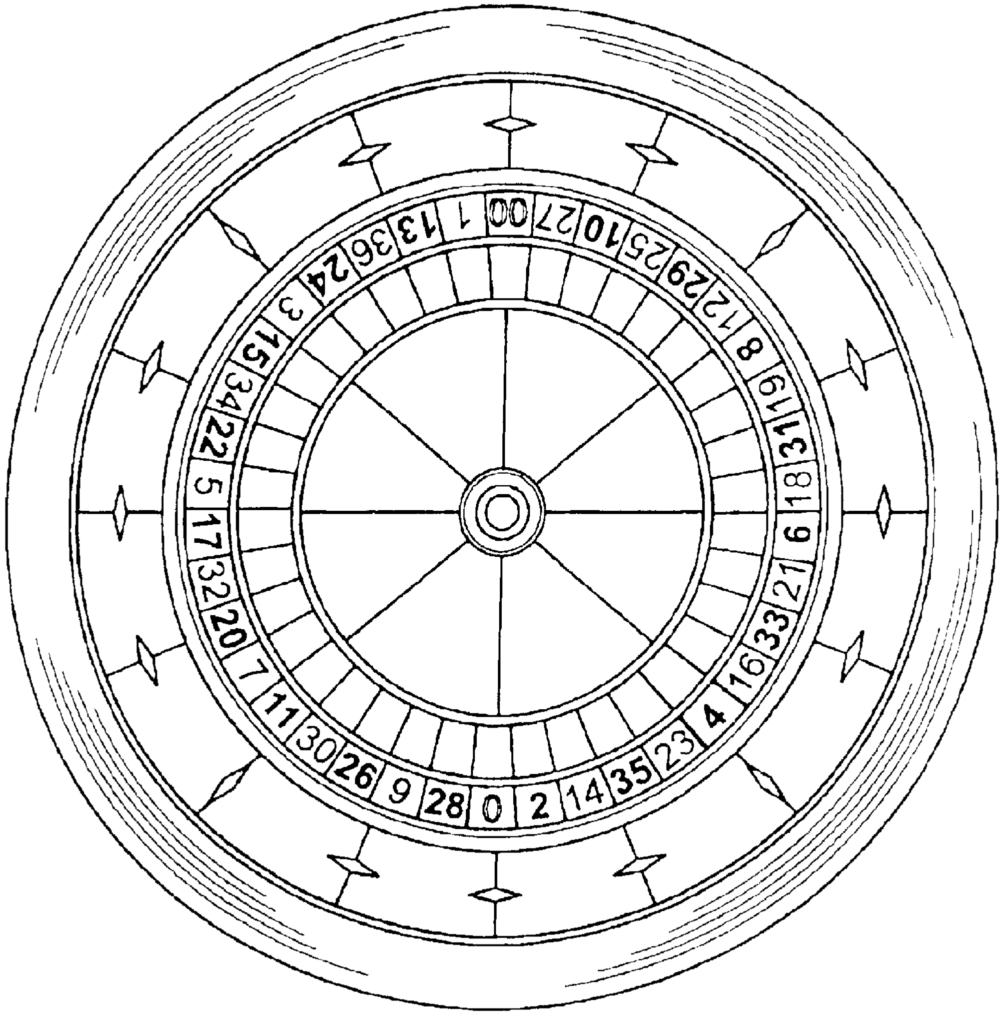
FIG. 2 (Prior Art)
FIG. 2 shows a Prior Art standard roulette wheel with 0 and 00 available on the wheel.

FIG. 2 shows a Prior Art standard roulette wheel with 0 and 00 available on the wheel.

Figure 3:
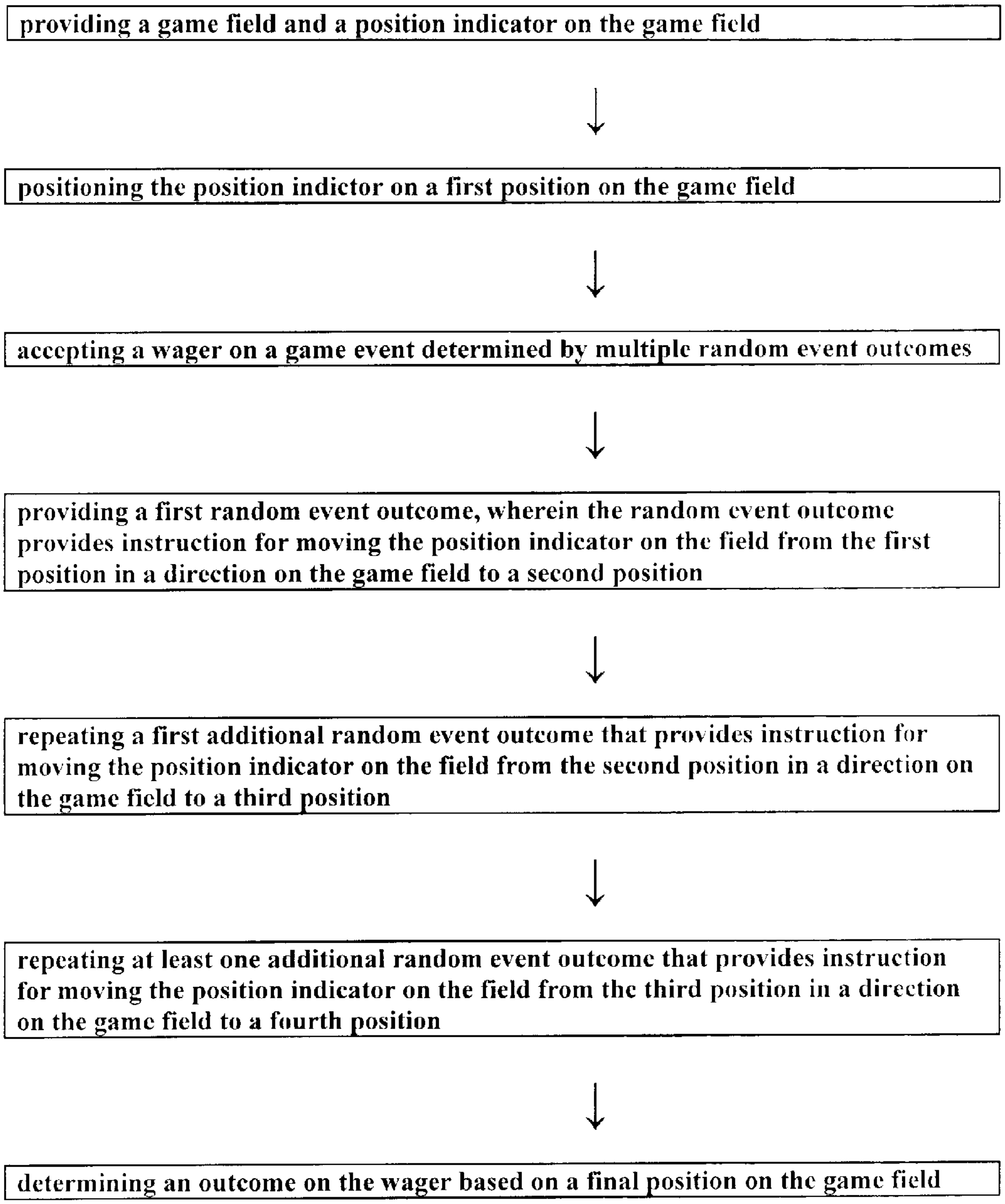
FIG. 3 is a flow diagram for play of a method according to a system enabling play of the present technology.

FIG. 3 is a flow diagram for play of a method according to a system enabling play of the present technology.

Figure 4:
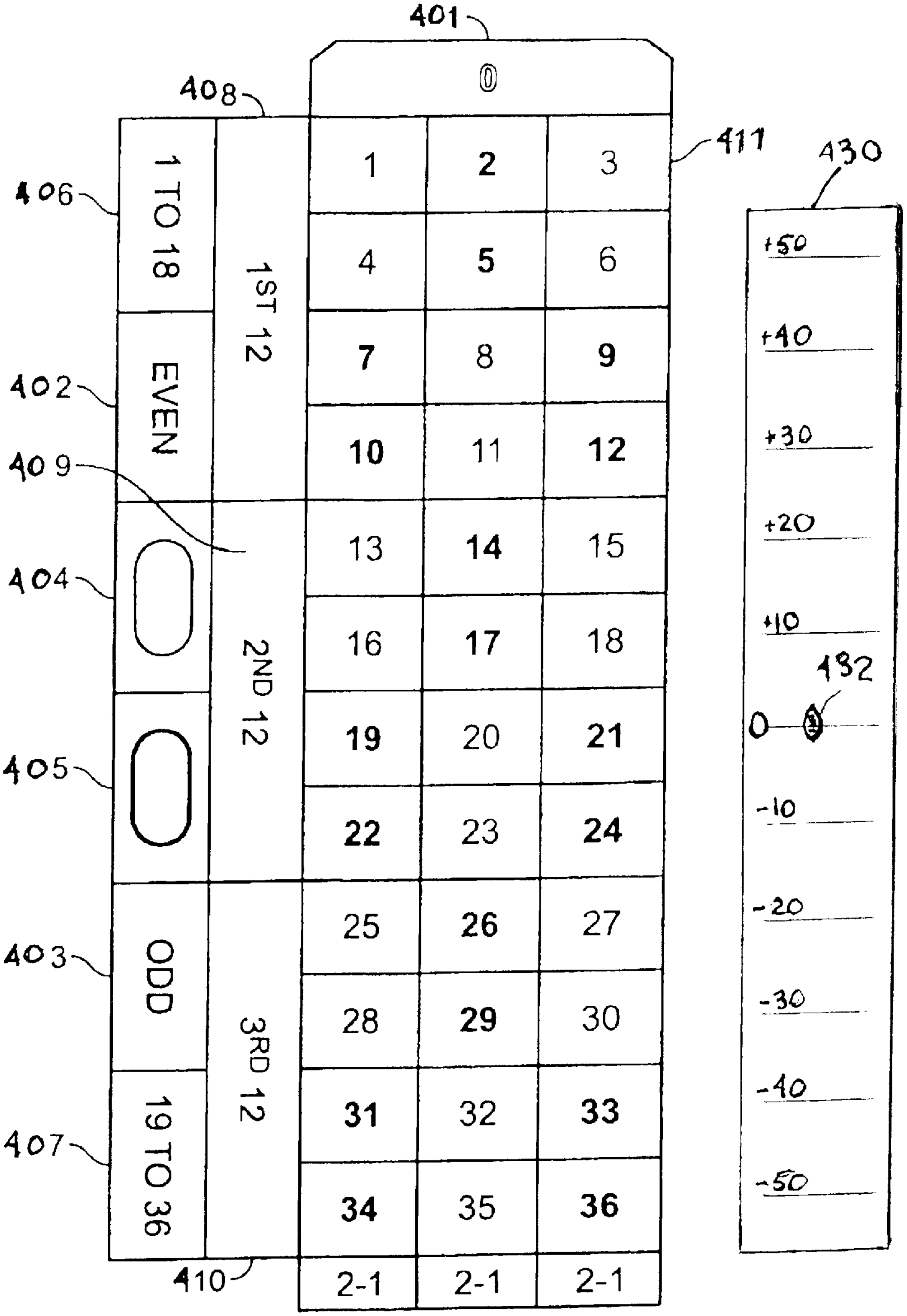
FIG. 4 shows a layout including both standard roulette wagers and an electronic panel registering random walk, or game play movement of a position indicator according to the technology enabled herein.

FIG. 4 shows a layout 401 including both standard roulette wagers 402 403, 404 405 406 407 408 409 410 and 411 and an electronic panel 430 registering random walk or game play movement of a position indicator 432 according to the technology enabled herein. In this FIG. 4, the lines of demarcation are at ±10 intervals, with the original position marker 432 shown as a football starting at the 0 position or 50-yard line. For purposes of simplifying the example, only a 0 (no 00) is shown on the layout 401. One manner of playing the game rules is to have wagers on the side game be placed on numbers, adjacent numbers, rows (three numbers), pairs of rows, columns and the like, or restrict the side bet wagers to outcomes on groups of twelve numbers (e.g., columns, or sets from 1-12, 13-24 or 25-36) to determine movement outcomes. Depending upon the size of the groups of numbers selected, the ± movement of the position markers would vary, with potentially greater movement for smaller numbers wagered upon in the side bet wager. Again, for simplicity, it will be assumed that sets of twelve (12) numbers will be used in the play, and these will be columns of numbers. The effects may be random on the outcomes, also, with the random outcomes suggested after bets have been concluded but before final outcome of the single event (e.g., the roulette spin and ball drop).

The following is a description of a first method of playing the random movement game event. The position market 432 is located at the 0 position (50-yard line) On the grid 430. The object is to move the ball at least +30 in four spins and outcomes. In this first method, 1-12 are each +10, 13-24 are each +5, and 25-36 are each −10. It is therefore possible for at one negative outcome (25-36) to occur and for the +30 to be achieved (with three occurrences of 1-12 and one occurrence of 25-36). It is also possible to achieve a result of +35 or +40 with four outcomes. Those final game results would win against a pay table more than a +30 result. The position indicator 432 is moved after each roulette spin outcome and reset when the end of game event (three spins, four spins, five spins, etc. as predetermined) occurs. The occurrence of a 0 (or 00, if present) may be differently addressed. The green numbers may be neutral and count as a spin, be neutral and not count as a spin result, may both be positive (+5 or +10) and count as a spin, may both be positive (+5 or +10) and not count as a spin, may both be equally and oppositely positive and negative (+5 and −5 or +10 and −10) and count as a spin, may both be equally and oppositely positive and negative (+5 and −5 or +10 and −10) and not count as a spin, or may end the game positively (moving the position indicator across the +50 line) or end the game negatively (moving the position indicator 432 across the −50 line).

Figure 5A:
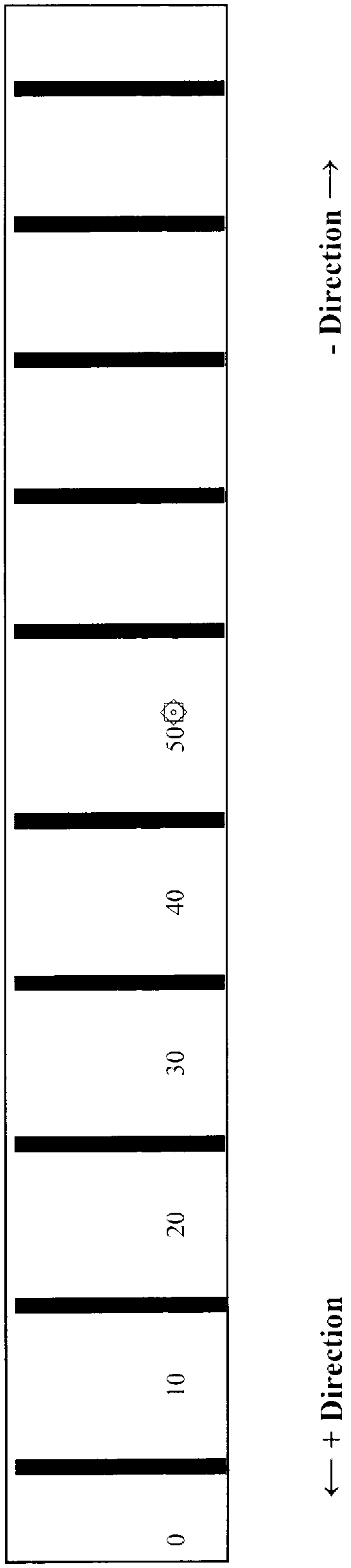
FIG. 5A shows a game Field 500 having only positive direction movement from 0 to 50 shown, with additional spacing allowed.

FIG. 5A shows a game Field 500 having only positive direction movement from 0 to 50 shown, with additional spacing allowed. A position indicator or marker ⊙ is shown in the 50 area.

Figure 5B:
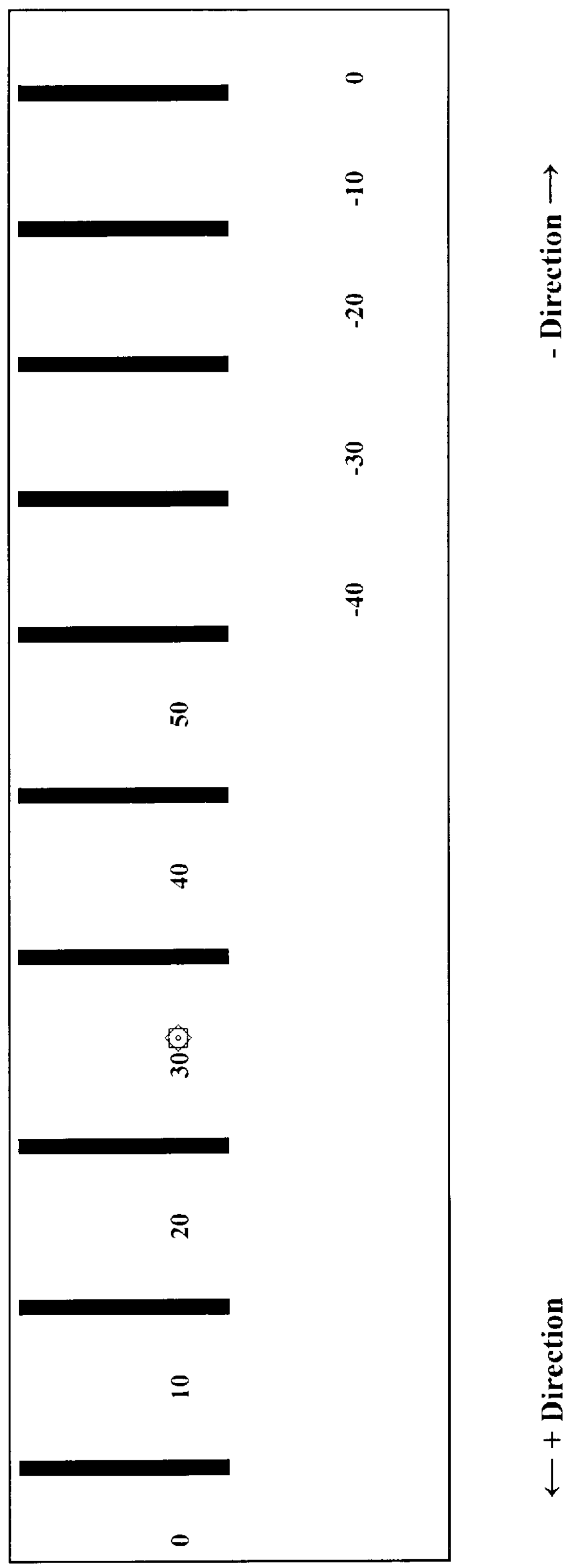
FIG. 5B shows a game Field 500 having both positive and negative movement from 0 to 0 (e.g., meters or yards) from one end of the field to the other, and units of 10 separating the area. A position marker ⊙ is shown in the 50 area.

FIG. 5B shows a game Field 500 having both positive and negative movement from 0 to 0 (e.g., meters or yards) from one end of the field to the other, and units of 10 separating the area. A position indicator marker ⊙ is shown in the 30 area as a result of a roulette game event causing the original position of the position indicator to have been moved, either manually or electronically.

The individual numbers in the sets of twelve numbers may also be absolute distance or value movement indicators (e.g., 1 moves +1, 2 moves +2, etc.) or they may be rounded off or grouped into sets (e.g., 1-5 move 5, 6-10 move 10 11-12 move 15; 13-24 move +10; 25-33 move −10 and 34-36 move −15).

The three Columns shall be referred to as 1-34, 2-35 and 3-36 as a shorthand notation. The same distance moving effects may be applied to the columns also, and the "yardage" moved may be more easily distributed, with one column being full positive in number values, e.g., the movement in column 1-34 would be equal to the number), a second column being half positive (e.g., the movement in column 2-35 would be +2/2, +5/2, +8/2, +11/2, +14/2, etc., and rounded up or down) and the third column being full negative (e.g., 3 would be −3, 6 would be −6, etc.). Many other variations in the impact of the numbers could be used to adjust the odds, the action and the outcomes.

As noted, the game may be played as a completely physical game (with a single position indicator or multiple position indicators moved by the croupier), an electromechanical game or an electronic game.

Another variation that may be used in the play of the game is to divide the vector of the movement by color, with either absolute distances moved for each color (e.g., absolute distances of 10 moved in a positive direction for all Black numbers and a negative direction for all Red Numbers. The Green events may be used (especially in this format) as a return to center (the 50 position, for example, of the 0 position if the position indicator began from there) or as a no movement event or as a return of half the distance to the starting point, or even a positive event, moving an additional X number of yards farther from the starting point than where the position indicator is presently located.

As noted above, the position indicators used in the game are moved from a starting point in a random manner, with at least two different vectors required in available position changes. For simplicity, the vectors are shown in FIG. 4 on a football field type layout as preferably opposite, such as forward and backwards along the field. Other arrangements on a displayed two-dimensional field may be up and down, left and right, clockwise and counterclockwise.

In a simplest format, used for purposes of a non-limiting example to enhance an appreciation of and enablement of the practice of the technology, wagers are available for a positive advancement (moving in the + direction) or a negative advancement (moving in the − direction) at least ±30 units in three consecutive spins of the roulette wheel. In this example, numbers 1-9 are +20 movements, 10-12 are +10 movements, 13-18 are +10 movements, 19-24 are −10 movements, numbers 25-33 are −20 movements, 34-36 are −10 movements, 0 is +5 movements and 00 is −5 movements. The wagers are placed in either a positive movement result or a negative movement result outcome. (It is possible with a different pay table to have an absolute movement outcome determined as a winning outcome). A typical pay table could be as follows, without limiting the scope of the invention to the precise numbers used as examples of the payout odds when there is a triggering event for use with the side bet, such as a required 0 or 00 after the side bet has been made to enter the side bet event:

TABLE 1

| DISTANCE MOVED | PAYOUT ODDS |
|---|---|
| + or −0-10 yards | 5:1 |
| + or −20 yards | 10:1 |
| + or −30 yards | 50:1 |
| + or −40 yards | 100:1 |
| + or −50 yards (Touchdown) | 1000:1 |

An aspect of the technology is that there are both positive and negative vectors available in movement, and even where there is a small adverse vector (positive when wagering on negative movement, or negative when wagering on positive movement), a win or push is still available. Thus, in the above example, if the wager is on a positive movement outcome, and the first spin is 00 (−5), subsequent spin outcomes of 1-9 and 10-18 will produce a final positive movement of +25 and a push. The probability of final position outcomes can be varied easily and thus the payout on the game adjusted easily by altering the odds and the distances for movement based on numbers. For example, 1 and 2 may be altered to +5 movements and 35 and 36 altered to −5 movement outcomes to reduce the payout rate. Similarly, 1 and 2 may be altered to +25 movements and 35 and 36 altered to −25 movement outcomes to increase the payout rate.

The game field may be linear (e.g., a football, soccer or straight-away race track), circular (e.g., a horse track, candy wheel, merry-go-round), arcuate (e.g., a rainbow, a missile trajectory) or even three-dimensional. Three-dimensional displays or pseudo three-dimensional displays are available on video monitors and may be used in the practice of the present technology. For example, wagers can be based upon distance moved and movement into specific planes or specific quadrants formed by ± movement along the x, y and z axes.

There would be 8 quadrants available in three-dimensional movement (1)+x, +y and +z; 2) −x, +y and +z; 3) −x, −y and +z; 4) −x, −y and −z; 5)+x, −y and +z; 6)+x, −y and −z; 7)+x, +y and −z; and 8) −x, +y and −z). There would also be 8 plane sectors available for positioning (e.g., x=0, +y and +z; x=0, −y and +z; x=0, −y and −z; x=0, +y and −z; y=0, +x and +z; y=0, −x and +z; y=0, −x and −z; y=0 and +x and −z; and z=0, +x and +y; z=0, −x and +y; z=0, −x and −y; and z=0, +x and −y). Wagers could be placed on quadrants, distances outward within (one or more) quadrants, plane sectors and distances outward on (one or more) plane sectors. A holographic display could also be used for the three-dimensional game event, and movement in three-dimensions could be more realistically portrayed. The holographic display could also be used thematically with characters, planets, vessels, music and other images from stories, films and history (such as Captain Horatio Hornblower and a sailing ship theme; Han Solo, Luke Skywalker, Chewbakka and Princess Leia from the Star Wars series of movies; characters from the Star Trek television series and movies; NASCAR race drivers (with circular tracks passing through different sectors or in just two dimensions); boxing matches with famous boxers moving through a three-dimensional ring; and the like).

When played in a three-dimensional format, the vectors may be opposite and/or along three traditional dimensional axes, such as right angle x-y-z axes, with + and − vectors along each axis, or angular vectors may be added with the occurrence of 0 and/or 00. The opportunities for variations in directions, themes and wagers are unlimited. For example, in a linear or three-dimensional field format, further randomness in outcomes may be provided through the use of a random negative or random positive event in addition to the underlying game play. For example, in the linear play representing a football field, a random number generator can add "penalty" yardage, moving the position marker positively or negatively on a random occurrence basis. These "penalties" would be random in occurrence (e.g., averaging, for example, in 1/50spin events) and limited in value (e.g., within a range of ±15 yards/penalty) and vector.

In the three-dimensional thematic displays, an occurrence such as a randomly moving (through the 8 quadrants) negative event such as a pirate ship, Death Star, Borg ship, or mine field could be displayed and a positive event such as a time warp, friendly escort vessel, solar wind and the like could be moved throughout the game field. That feature would add additional excitement and entertainment to the gaming system.

The following is an example of play of a game according to the following Rules.

EXAMPLE 1

Rules

All movements are in absolute units of 5 yards for numbers between 1 and 16, and all numbers between 17 and 31 are in absolute units of 10 yards, and 32-34 are in absolute unites of 15 yards on the Field. The occurrence of a 0 uses a game play in the game without movement, and the occurrence of 00 causes the position indicator to move half-way back to the 50 area, or if in the 50 area to not move at all. Red numbers move the position indicator ⊙ in a negative sense, in FIGS. 3A and 3B movement is towards the RIGHT. Black numbers move the position indicator ⊙ in a positive sense towards the LEFT. The position indicator ⊙ is started in the 50 area at the beginning of each new game.

Players have the option of wagering on negative movements or positive movement outcomes or absolute movement (i.e., total distance from the 50 area in either direction). Table 1 indicates the odds for absolute movement, and Table 2B (below) shows the odds for specific direction movement, with the original wager made specifically on a single direction when the side bet is played as a direct game, without any triggering event. Table 2A is the odds table when there is a triggering event of, for example, the appearance of a 0 or 00 after placement of the side bet wager Again, the odds are exemplary and not intended to be limiting in the scope of the technology of the present invention:

TABLE 2A

| DISTANCE MOVED | PAYOUT ODDS |
|---|---|
| + or −0-10 yards | 0-5:1 |
| + or −10 yards | 10:1 |
| + or −20 yards | 25:1 |
| + or −30 yards | 50:1 |
| + or −40 yards | 100:1 |
| + or −50 yards | 1000:1 |

TABLE 2B

| DISTANCE MOVED | PAYOUT ODDS |
|---|---|
| + or −0-10 yards | 0-1:1 |
| + or −10 yards | 1:3/2 |
| + or −20 yards | 3:2-5:1 |
| + or −30 yards | 4:1-10:1 |
| + or −40 yards | 8:1-15:1 |
| + or −50 yards | 12:1-50:1 |

Using the non-triggered, direct wagering side bet and Table 2B, player 1 wagers $10 on negative (Red favored) movement. Player 2 wagers $15 on Positive (Black favored) movement. Player 3 wagers $20 on movement in absolute movement.

The position indicator is started at the beginning of a game with four spins of the roulette wheel being the side bet termination event. That is, after four roulette spins, no matter what the position of the position indicator (which is the same indicator for all players), the game ends and the wagers are resolved. A sound system is provided to indicate cheering and the background noise of a game as the position indicator is moved.

SPIN 1—is RED 5. The position indicator is moved to the RIGHT 5 yards. That would be done by placing the indicator on the line separating the 50 area from the 40 area.

SPIN 2—is RED 30. The position indicator is moved to the RIGHT 10 yards. That would be done by placing the indicator on the line separating the 40 area from the 30 area.

SPIN 3—is RED 27. The position indicator is moved to the RIGHT 10 yards. That would be done by placing the indicator on the line separating the 30 area from the 20 area. At this time, the position indicator is 25 yards to the RIGHT (a negative move according to the Field). Even though the position indicator is in a winning region for two players if the game were decided at that point, there is another spin left that will be used to determine a final outcome.

SPIN 4—is BLACK 8. The position indicator is moved 5 yards to the LEFT. The final position indicator position is then −20 on the Field. Player one would be paid $10, a push on his wager, but win nothing extra. Player 2 would lose his wager. Player 3 would be paid $10 and his wager, for a net win of $10.00.

EXAMPLE 2

In this variation, again played on the game board Field shown in FIGS. 3A and 3B, numbers from 1-12 move absolute values of 5 yards, numbers from 13-23 move absolute values of 10 yards, numbers from 24-34 move absolute values of 15 yards, and 35 and 36 move absolute values of 25 yards. Again, the occurrence of a 0 uses a game play in the game without movement, and the occurrence of 00 causes the position indicator to move half-way back to the 50 area, or if in the 50 area to not move at all. The wagers by the three players are the same as in Example 1.

SPIN 1—BLACK 21. The position indicator is moved 10 yards to the left onto the 40 yard area.

SPIN 2—00. The position indicator is moved 5 yards back towards the center, on the line separating the 50 area from the 40 area.

SPIN 3—35 Black. The position indicator is moved 25 yards to the left into the 20 yard area. At this point, again, two of the players are in a winning environment. The audio feed could be increased or changed to a different quality of content as the ball is spun on the fourth spin in anticipation of the outcome.

SPIN 4—7 Red. The position indicator is moved 5 yards to the right onto the 25 yard area, the line separating the 30 area from the 20 area. According to the tables, Player 1 would lose his wager. Player 2 might be paid $15 plus his initial wager, for a net win of $15. Player 3 would be paid $10 plus his initial wager, for a net win of $10.

Another variation in the game could separate the absolute value of the yardage of the game by units where 1-10 (±5 yards), 11-20 (±10 yards), 21-30 (15 yards) and 31-36 (±20 yards). The game allows for variations and control; of the movement and therefore adjustment in the house hold. Using electronic system and electronic position sensors, the electronics could move pieces in direct relationship to the numbers, such as 3 yards. Game rules could be provided that any movement of 6 yards or less (oe 4 yards or less), would then not be counted as a play in the side bet game.

EXAMPLE 3

This example covers the side bet as requiring a trigger event for the side bet position changing game to be active.

After repeated side bets having been placed and no triggering event occurring (so that all previous side bets had been withdrawn), Players 1, 2 and 3 made $1, $2 and $5 side bets and player 4 made no side bet on an electronic wagering system on a roulette table with a physical reel and ball drop. The ball drop was electronically read (a photo-optical system read the ball position, the system signaled the processor of the appearance of the landing position as 00, and the side bet game was engaged. A video screen was displayed over the roulette table with the game field displayed thereon. A position indicator was shown on the 50-yard mark in a 100 yard (±50) game field. The roulette wheel was spun three times, and after each spin, the position indicator was moved appropriately distances of +5 yards, −10 yards and −20 yards for a total movement of −25 yards. The following payout table was used:

| DISTANCE MOVED | PAYOUT ODDS |
|---|---|
| + or −0-10 yards | 0-5:1 |
| + or −10 yards | 10:1 |
| + or −20 yards | 25:1 |
| + or −30 yards | 50:1 |
| + or −40 yards | 100:1 |
| + or −50 yards | 1000:1 |

Based on this event, Player 4 was not involved in the side bet game as no side bet wager was placed. The payout odds are 25:1, so Player 1's wager was resolved by his receiving $25.00. Player 2 received $50.00 and Player 3 received $125.00. It is an option that (as shown above) the side bet is immediately collected, and the payout is made on odds, or that the side bet is also returned to the player so that the payout to the players would have been Player 1's wager was resolved by his receiving $25.00 plus the $1 side bet. Player 2 received $50.00 plus the $2 side bet, and Player 3 received $125.00 plus the $5 side bet.

In the play of this example, both the wagering and the movement of the position indicator and the resolution of wagers was performed by an electronic system. This greatly speeds up the operation of the game, can add better visual impact to the play of the side bet game, and reduce error.

The payout odds may change at only 10-yard increments or may change in 1 or 5 yard increments (or other increments) at the discretion of the designer.

Although specific numbers, layouts, apparatus and rules have been described, they are to be considered as specific examples within the generic concepts and scope of the inventions and claims. They are not intended to be absolute limitations in the play of the present method and apparatus technology. One skilled in the art would be able to provide variations and alternatives within the described generic scope.

What is claimed:

1. A method of providing a side bet game in an underlying wagering game comprising: a) providing a game field for the side bet game and a position indicator on the game field; b) positioning the position indicator on a first position on the game field; c) accepting a wager on a side bet game event determined by a predetermined maximum number of multiple random event outcomes in the underlying game; d) providing a first random event outcome, wherein the random event outcome provides instruction for moving the position indicator on the field from the first position in a direction on the game field to a second position; e) repeating a first additional random event outcome that provides instruction for moving the position indicator on the field from the second position in a direction on the game field to a third position; f) repeating at least one additional random event outcome that provides instruction for moving the position indicator on the field from the third position in a direction on the game field to a fourth position; and g) determining an outcome on the side bet wager based on a final position on the game field determined by reaching the predetermined maximum number of multiple random outcomes, whether or not a position has been reached beyond which the position indicator cannot be moved, and wherein random event outcomes are provided by a random event generator selected from the group consisting of i) a roulette wheel and ball and ii) a processor associated with a video display and software executable by the processor to display the game field and position pieces on the video display.

2. The method of claim 1 wherein the fourth position is the final position and the random event outcomes are produced on a physical roulette wheel and drop ball, and the position indicator is a physical object placed on a game table having markings thereon that identify distances of movement along the game field.

3. The method of claim 2 wherein at least one additional random event outcome that provides instruction for moving the position indicator on the field from the fourth position in a direction on the game field to a fifth position; and determining an outcome on the wager based on a final position on the game field at the fifth position.

4. The method of claim 3 wherein the random event outcome comprises a ball drop in a roulette wheel.

5. The method of claim 4 wherein a red number outcome indicates movement of the position indicator in a first direction having a first vector and a black number outcome indicates movement of the position indicator in a second direction having a second vector different from the first vector.

6. The method of claim 3 wherein the random event outcome comprises a virtual ball drop in a virtual roulette wheel and the virtual ball drop and virtual roulette wheel are provided by executing code on a processor and displaying virtual ball drop outcomes on a display monitor.

7. The method of claim 6 wherein a red number outcome indicates movement of the position indicator in a first direction having a first vector and a black number outcome indicates movement of the position indicator in a second direction having a second vector different from the first vector.

8. The method of claim 2 wherein the random event outcome comprises a ball drop in a roulette wheel.

9. The method of claim 8 wherein a red number outcome indicates movement of the position indicator in a first direction having a first vector and a black number outcome indicates movement of the position indicator in a second direction having a second vector different from the first vector.

10. The method of claim 1 wherein the random event outcome comprises a ball drop in a roulette wheel.

11. The method of claim 10 wherein a red number outcome indicates movement of the position indicator in a first direction having a first vector and a black number outcome indicates movement of the position indicator in a second direction having a second vector different from the first vector.

12. The method of claim 1 wherein the random event outcome comprises a virtual ball drop in a virtual roulette wheel and the virtual ball drop and virtual roulette wheel are provided by executing code on a processor and displaying virtual ball drop outcomes on a display monitor.

13. The method of claim 12 wherein a red number outcome indicates movement of the position indicator in a first direction having a first vector and a black number outcome indicates movement of the position indicator in a second direction having a second vector different from the first vector.

14. The method of claim 1 wherein the game field is a three-dimensional game field displayed on a monitor or holographic display and the position indicator is moved within the three-dimensional game field based upon the random event outcomes.

15. The method of claim 14 wherein the three-dimensional game field is displayed on a holographic display system and random positive events and random negative events are displayed on the holographic display that occur independently from the random event outcomes.

16. A gaming system comprising: a) a game field and a position indicator on the game field; b) the position indictor initially positioned on a first position on the game field; c) a wager acceptor on a game event determined by a predetermined maximum number of multiple random event outcomes; d) a first random event outcome generator, wherein the random event outcome provides instruction for moving the position indicator on the field from the first position in a direction on the game field to a second position; e) the same random event outcome generator being adapted to repeat a first additional random event outcome that provides instruction for moving the position indicator on the field from the second position in a direction on the game field to a third position; f) the same random event outcome generator being configured to repeat at least one additional random event outcome that provides instruction for moving the position indicator on the field from the third position in a direction on the game field to a fourth position; and g) a look-up table for determining an outcome on the wager based on a final position on the game field determined by reaching the predetermined maximum number of multiple random outcomes.

17. The system of claim 16 wherein the game field is a three-dimensional game field displayed on a monitor or holographic display and the position indicator is movable within the three-dimensional game field based upon the random event outcomes.

18. The system of claim 17 wherein the three-dimensional game field is displayed on a holographic display system and a processor generates random positive events and random negative events that are displayed on the holographic display that occur independently from the random event outcomes.

19. The method of claim 1 wherein the fourth position is the final position and the random event outcomes are produced on an electronic random number generator associated with a processor, and the position indicator is a physical object placed on a game table having markings thereon that identify distances of movement along the game field.

20. A method of providing a side bet game in an underlying wagering game comprising: a) providing a game field and a position indicator on the game field; b) positioning the position indictor on a first position on the game field; c) accepting a wager on a side bet game event determined by a predetermined maximum number of multiple random event outcome; d) providing an underlying game triggering event for the side bet; e) providing a first random event outcome in the underlying game that is used in the side bet game, wherein the random event outcome provides instruction for moving the position indicator on the field from the first position in a direction on the game field to a second position; f) repeating a first additional random event outcome that provides instruction for moving the position indicator on the field from the second position in a direction on the game field to a third position; g) repeating at least one additional random event outcome that provides instruction for moving the position indicator on the field from the third position in a direction on the game field to a fourth position; and h) determining an outcome on the wager based on a final position on the game field determined by reaching the predetermined maximum number of multiple random outcomes, whether or not a position has been reached beyond which the position indicator cannot be moved, and wherein random event outcomes are provided by a random event generator selected from the group consisting of i) a roulette wheel and ball and ii) a processor associated with a video display and software executable by the processor to display the game field and position pieces on the video display.

21. The method of claim 20 wherein the fourth position is the final position.

22. The method of claim 20 wherein at least one additional random event outcome that provides instruction for moving the position indicator on the field from the fourth position in a direction on the game field to a fifth position; and determining an outcome on the wager based on a final position on the game field at the fifth position.

23. The method of claim 21 wherein the random event outcome comprises a ball drop in a roulette wheel.

24. The method of claim 20 wherein the random event outcome comprises a ball drop in a roulette wheel.

25. The method of claim 24 wherein a red number outcome indicates movement of the position indicator in a first direction having a first vector and a black number outcome indicates movement of the position indicator in a second direction having a second vector different from the first vector.

26. The method of claim 20 wherein the fourth position is the final position and the random event outcomes are produced on a physical roulette wheel and drop ball, and the position indicator is a physical object placed on a game table having markings thereon that identify distances of movement along the game field.

27. The method of claim 20 wherein the fourth position is the final position and the random event outcomes are produced on an electronic random number generator associated with a processor, and the position indicator is a physical object placed on a game table having markings thereon that identify distances of movement along the game field.

* * * * *